United States Patent [19]

McCreary et al.

US005084097A

[11] Patent Number: 5,084,097

[45] Date of Patent: Jan. 28, 1992

[54] AEROSOL SPRAY FOR SELF PROTECTION AND IDENTIFICATION OF ASSAILANTS

[76] Inventors: A. James McCreary; Cynthia D. McCreary, both of 55 Kingsbridge Garden Circle, Suite 1103, Mississauga, Ontario, Canada, L5R 1Y1

[21] Appl. No.: 467,011

[22] Filed: Jan. 18, 1990

[51] Int. Cl.$^5$ ............................................. C09D 11/00
[52] U.S. Cl. ........................................ 106/19; 424/43; 424/63
[58] Field of Search .................. 106/19; 8/404, 436; 252/305; 424/43, 63

[56] References Cited

U.S. PATENT DOCUMENTS

| | | | |
|---|---|---|---|
| 2,159,241 | 5/1939 | Williams | 424/43 |
| 2,171,701 | 9/1939 | Howett | 424/43 |
| 3,640,889 | 2/1972 | Stewart | 424/63 |
| 3,708,334 | 1/1973 | Firth et al. | 106/22 |
| 3,873,687 | 3/1975 | Demko | 106/19 |
| 3,972,675 | 8/1976 | Schwank | 8/404 |
| 4,050,944 | 9/1977 | Cartwright | 106/19 |
| 4,145,413 | 3/1979 | Usdin et al. | 424/63 |
| 4,155,886 | 5/1979 | DeGoler | 106/19 |
| 4,280,813 | 7/1981 | DeGoler | 8/404 |
| 4,610,806 | 9/1986 | Rosen | 106/22 |
| 4,678,658 | 7/1987 | Casey et al. | 252/106 |
| 4,728,037 | 3/1988 | Mainhardt | 222/491 |
| 4,793,988 | 12/1988 | Casey et al. | 252/106 |

FOREIGN PATENT DOCUMENTS 014480 5/1975 Japan .

Primary Examiner—William R. Dixon, Jr.
Assistant Examiner—Helene Klemanski
Attorney, Agent, or Firm—Carson, Armstrong

[57] ABSTRACT

A non-toxic dye in an aerosol container to be used for protection against an assailant is disclosed. The dye is an irritant to skin and eyes and is also a semi-permanent marking dye which is intended to aid in the identification of the assailant by police.

7 Claims, No Drawings

AEROSOL SPRAY FOR SELF PROTECTION AND IDENTIFICATION OF ASSAILANTS

BACKGROUND OF THE INVENTION

This invention relates to a personal protection and criminal identification device. An aerosol spray container of non-toxic dye is designed to help individuals defend themselves from assailants while marking the criminal with a dye that will later help identify the criminal to police and others.

In today's society, people are often frightened to walk alone, for fear of attack. Various methods of self-protection have been tried. For example, weapons can be carried, or ordinary objects such as keys can be used as temporary weapons. While carrying weapons can be illegal, the most important problem with this method is the possibility that if the victim is not strong enough to stay in control of the weapon, it can be taken away and used against them by the assailant.

Noise makers are also available which emit a loud "screech". These devices are intended to call attention to the situation. This is of little value if there is no one around to hear the noise, or if bystanders do not recognize the noise as a distress signal, or if they ignore the noise.

Chemical irritants such as mace, like the noise-making products, do not require great strength, and are sometimes used by individuals to defend themselves when they are attacked. Such products can be dangerous, however, and there is also the potential for the mace to be taken from the victim and turned against him or her.

SUMMARY OF THE INVENTION

It is an object of the invention to provide a safe substitute for mace and the like, which will also serve the purpose of marking an assailant for identification purposes. The invention does not use a toxic substance, so if it is used against the victim, it will not cause any serious damage. The spray should surprise the assailant, and when sprayed towards the face will sting the assailant's eyes and face, since the dye is an irritant. This should in most cases provide the victim with an opportunity to escape.

At the same time, the indelible dye will mark someone for a significant period of time, possibly from three days to three weeks. This should help identify the assailant and make it easier for identification by the police.

Thus in accordance with the present invention there is provided a dye based on FD & C and DC dyes, which are non-toxic. The dye is in a conventional aerosol can approximately 4½ inches tall (including cap) by 1½ inches in diameter. The invention is intended to be small enough to be carried in purses and pockets, so that it can be readily available if needed.

DETAILED DESCRIPTION OF THE PREFERRED EMBODIMENT

In the invention, the dye mixture is provided in a conventional aerosol spray canister, approximately 4½ inches tall (including cap by 1½ inches in diameter. The canister is intended to be small enough to be carried in purses and pockets, so that it can be readily available if needed.

The specific formulation of the preferred dye mixture is as follows, with the percentages being by weight. The preferred total fill weight per unit is 50 grams.

| | |
|---|---|
| FD&C Green #15794, supplied by Tricon | 3.14% |
| Ariavit Green S #312524, supplied by Charles Tennant | 1.62% |
| Water (deionized), supplied by Crystal Springs | 85.57% |
| Triton X-100, supplied by Rohm & Haas | 0.10% |
| Formaldehyde, supplied by Ashland Chemicals | 0.05% |
| Hydrocarbon propellant (A-70), supplied by Stanchem - CIL | 9.52% |
| | 100.00% |

An alternative formulation is as follows:

| | |
|---|---|
| D&C Green #5 (Alizarin Green Cyanine J) | 3.30% |
| D&C Green #3 (Fast Green #3) | 1.70% |
| Water (deionized) | 89.85% |
| Triton X-100 | 0.10% |
| Formaldehyde | 0.05% |
| Hydrocarbon propellant (A-46) | 5.00% |
| | 100.00% |

The concentrate for the alternative formulation has the following specifications at 25 degrees C:
pH: 7.0
Specific Gravity: 0.9731
Colour: Green
Solid: 5.37

The specification of the finished product according to the alternative formulation, i.e. after dilution with the deionized water, is as follows, again at 25 degrees C:
Specific Gravity: 0.9616
Vapour Pressure: 45 psig
Spray Rate: 1.6 mg/sec
Flame Extension: Nil The specifications for the preferred formulation are not presently available, but are presumed to be similar.

The canister is a conventional one supplied by Lechner GMBH, West Germany, and in the preferred embodiment is 35×97mm, microflex lined. The valve is supplied by Precision Valve Canada Ltd, and has the following specifications:
Stem—0.024
Spring—stainless steel
Gasket—neoprene
Housing—0.080 bonded
Cup—conical, epon top & bottom, undimpled, bonded, lip P/E sleeve
Dip tube—96 mm The actuator is a 0.016 MB Aqua Delta, also supplied by Precision Valve Canada Ltd.

The dyes used in the formulation are FD & C approved for internal and external use in drug and cosmetic preparations. The small amount of detergent used in the formulation is a mild irritant, but it is safe. The detergent creates a ¼" buildup which has a strong psychological impact on the assailant, and which makes the composition difficult to remove immediately. The dye therefore has a greater length of time to work into the skin, producing a mark which is extremely difficult to remove.

It will be appreciated that the above description relates to the preferred embodiment by way of example only.

Many variations on the invention will be obvious to those knowledgeable in the field, and such obvious variations are within the scope of the invention as described and claimed, whether or not expressly described.

For example, it should be appreciated that the above compositions could be varied substantially by those knowledgeable in the field.

What is claimed as the invention is:

1. A skin marking composition operable as a personal security device, comprising a skin markingly effective amount of at least one water soluble dye, water for dissolving said dye and diluting said skin marking composition, a hydrocarbon propellant for propelling said dissolved dye as an aerosol, wherein said skin marking composition is propellable as an aerosol, whereby contact of said aerosol with skin of an assailant visibly marks said assailant under visible light for a prolonged period of time.

2. A skin marking composition operable as a personal security device as claimed in claim 1, wherein said skin markingly effective amount of a dye comprises from about 0.05% to 10.0% per cent by weight.

3. A skin marking composition operable as a personal security device as claimed in claim 1, wherein said dye is selected from the group consisting of FD&C Green #15794, Ariavit Green S #312524, D&C Green #5, or D&C Green #3.

4. A skin marking composition operable as a personal security device as claimed in claim 1, wherein said skin marking composition comprises a surfactant.

5. A skin marking composition as recited in claim 1, where said composition is non-odiferous.

6. In a personal security device having a container and a reservoir therein containing a skin marking composition, the improvement wherein said container is pocket-sized and thereby concealable manually and has an actuator in communication with said marking composition in said reservoir, wherein said marking fluid comprises a skin markingly effective concentration of a dye, and wherein said marking composition is propellably deliverable as an aerosol from said container by depressing said actuator whereby contact of said aerosol with skin of an assailant visibly marks said assailant under visible light for a prolonged period of time.

7. A personal security device as claimed in claim 6, where said skin marking composition is non-odiferous.

* * * * *